United States Patent
Rosenhahn et al.

(10) Patent No.: US 6,527,424 B2
(45) Date of Patent: Mar. 4, 2003

(54) HEADLIGHT FOR VEHICLE FOR PRODUCING A LOW BEAM AND AT LEAST ONE LIGHT BEAM WITH GREATER RANGE WITH SAFETY DEVICE FOR MONITORING ADJUSTMENT OF RELATIVE POSITION BETWEEN LIGHT SOURCE AND REFLECTOR

(75) Inventors: Ernst-Olaf Rosenhahn, Bodelshausen (DE); Michael Hamm, Pfullingen (DE); Walter Thieringer, Reutlingen (DE); Rainer Wuestenhagen, Holzgerlingen (DE); Doris Boebel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/928,892

(22) Filed: Aug. 13, 2001

(65) Prior Publication Data

US 2002/0075693 A1 Jun. 20, 2002

(30) Foreign Application Priority Data

Aug. 18, 2000 (DE) .......................................... 100 40 573

(51) Int. Cl.$^7$ ............................................... F21V 17/02
(52) U.S. Cl. ....................... 362/513; 362/514; 362/523; 362/276; 362/286
(58) Field of Search ................................ 362/513, 512, 362/514, 523, 276, 277, 286, 263

(56) References Cited

U.S. PATENT DOCUMENTS

| | | | | |
|---|---|---|---|---|
| 5,707,129 A | * | 1/1998 | Kobayashi | 362/464 |
| 5,785,405 A | * | 7/1998 | Huhn | 362/459 |
| 5,899,559 A | * | 5/1999 | Lachmayer et al. | 362/513 |
| 5,997,162 A | * | 12/1999 | English et al. | 362/508 |

FOREIGN PATENT DOCUMENTS

DE     44 35 507 A1     4/1996

\* cited by examiner

*Primary Examiner*—Sandra O'Shea
*Assistant Examiner*—Ronald E. DelGizzi
(74) *Attorney, Agent, or Firm*—Michael J. Striker

(57) ABSTRACT

A headlight for a vehicle for producing a low beam and at least one light beam with a greater distance, the headlight comprising a light source, a reflector, the light source and the reflector together forming a headlight unit, an electrically adjusting device for changing a relative position between the light source and the reflector, a light width adjusting device for turning the headlight insert about an at least approximately horizontally extending axis, and a safety device operative for monitoring at least indirectly an operation of the adjusting device and in the case of an error when the adjusting device operates not in an orderly manner, the safety device reduces an electric power with which the light source is operated and/or reduces a distance of a light beam produced by the headlight unit.

7 Claims, 2 Drawing Sheets

HEADLIGHT FOR VEHICLE FOR PRODUCING A LOW BEAM AND AT LEAST ONE LIGHT BEAM WITH GREATER RANGE WITH SAFETY DEVICE FOR MONITORING ADJUSTMENT OF RELATIVE POSITION BETWEEN LIGHT SOURCE AND REFLECTOR

BACKGROUND OF THE INVENTION

The present invention relates to headlight for vehicle for producing a low beam and at least one light beam with a greater range.

A headlight of this type is disclosed for example in the patent document DE 44 35 507 A1. This headlight has a light source and a reflector, which forms a headlight insert. The headlight has an electrical adjusting device for adjusting the relative position between the light source and the reflector in order to provide the low beam and the light beam with a greater distance. The headlight also has a light width adjusting device, which is operative for turning the headlight insert for adjusting the light width of the light bundle emitted by the headlight about an at least approximately horizontally extending axis. In the case of a faulty function of the adjusting device, the relative position between the light source and the reflector remains within the position which is predetermined for producing the light beam with the greater distance, whereby in countertraffic a blinding is caused, which must be avoided.

SUMMARY OF THE INVENTION

Accordingly, it is an object of the present invention to provide a headlight of the above mentioned general type which avoids the disadvantages of the prior art.

In keeping with these objects and with others which will become apparent hereinafter, one feature of present invention resides, briefly stated in a headlight which has a safety device for monitoring at least indirectly the operation of the adjusting device, and in the event of a failure when the adjusting device does not operate in an orderly function, the electrical power with which the light source is operated is reduced and/or the distance of the light beam produced by the headlight insert is reduced.

When the headlight is designed in accordance with the present invention, the safety device recognizing a faulty functioning of the adjusting device, and a blinding of the countertraffic can be avoided. This can be performed by reducing the power with which the light source is operated and/or by turning the headlight insert downwardly by the light width adjusting device for reducing the light width.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
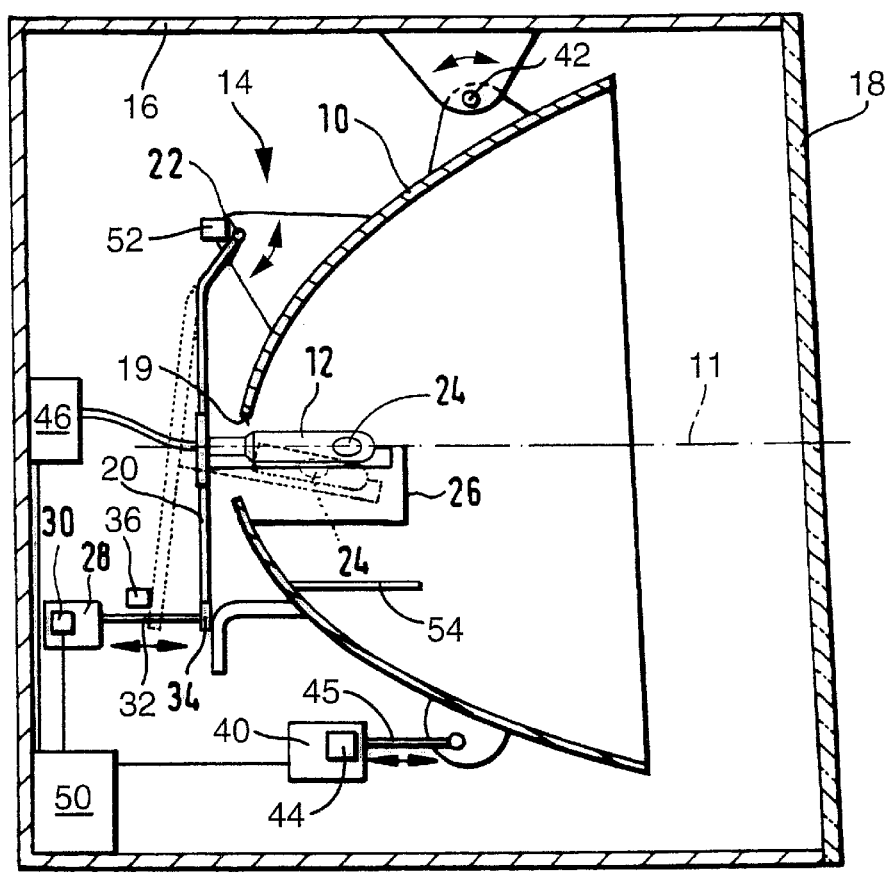
FIG. 1 is a view showing a headlight in accordance with the present invention in a vertical longitudinal section.

FIG. 1 shows a headlight for a vehicle, in particular for a motor vehicle, for alternating generation of a low beam and at least one light beam with a greater distance for example a high beam. The headlight has the reflector 10 and a light source 12 which is an incandescent lamp or preferably a gas discharge lamp. The reflector 10 with the light source 12 form a headlight insert 14 which is adjustably arranged in a holder or a housing 16. The light outlet opening of the housing 16 is covered with a light permeable member or disk 18 composed of glass or plastic. It can be formed as a smooth disk or at least a partially provided with optical profiles for a deviation and/or dispersion of the light. The reflector 10 is a concavely curved and its apex region has an opening 19 for the light source 12.

The relative position between the light source 12 and the reflector 10 is changeable, in particular by moving the light source 12 relative to the reflector 10. It can be also provided that the reflector 10 is movable relative to the light source 12. The light source 12 is held in a lamp support 20 which is supported turnably about an at least approximately horizontally extending axis 22 at least indirectly on the reflector 10. The turning axis 22 extends near the upper edge of the lamp support 20. The light source 12 extends with its glass container, in which it forms during operation a light arc 24, through the opening 19 in the reflector 10, so that the light emitted by the light arc 24 is reflected by the concavely curved reflection surface of the reflection 10. A screening device 26 can be associated with the light source 12 for screening a part of the light which is emitted by the light source 12, so that it does not fall on the reflector 10. The screening device 26 can produce a bright-dark limit of the light beam exiting the headlight.

An electrically adjusting device 28 engages the lamp support 20 eccentrically to the turning axis 22. The adjusting device 28 turns the lamp support 20 together with the light source arranged on it around the axis 22. The adjusting device 28 has an electric motor 30 operating as a drive, so as to rectilinearly displace the adjusting rod 32 engaging the lamp support 20 for example through a transmission. The electric motor 30 is formed for example as a stepper motor. From an adjusted base position, it can provide turning to each position of the adjusting rod 32 and thereby the lamp support 20 by a predetermined number of steps of the electric motor 30.

The lamp support 20 and the light source 12 held in it are movable by the adjusting device 28 between an end position for low beam and at least one further position. When the lamp support 20 with the light source 12 is located in the end position for low beam, the light emitted by the light source 20 is reflected by the reflector 10 as a low beam with an upper bright-dark limit, through which the distance of the low beam is limited so that it does not cause blinding of the countertraffic. When the lamp support 20 with the light source 12 is located in the further position, the light emitted by the light source 20, because of the changed arrangement of the light source 20 relative to the reflector 10, is reflected by the reflector 10 as a high beam with a greater distance than the low beam and with lower clearly pronounced bright-dark limit.

In FIG. 1 the lamp support 20 and the light source 12 are shown in solid lines in their position for low beam. The lamp support 20 can be located in abutment against an abutment 34, with which the exact arrangement of the light source 12 relative to the reflector 10 is guaranteed, as required for producing the low beam with the prescribed position of the bright-dark limit. The light source 12 in the position of low beam is arranged relative to the reflector 10 so that the light emitted by its light arc 24 is a downwardly inclined light beam which has an asymmetrical upper bright-dark limit.

Figure 2:
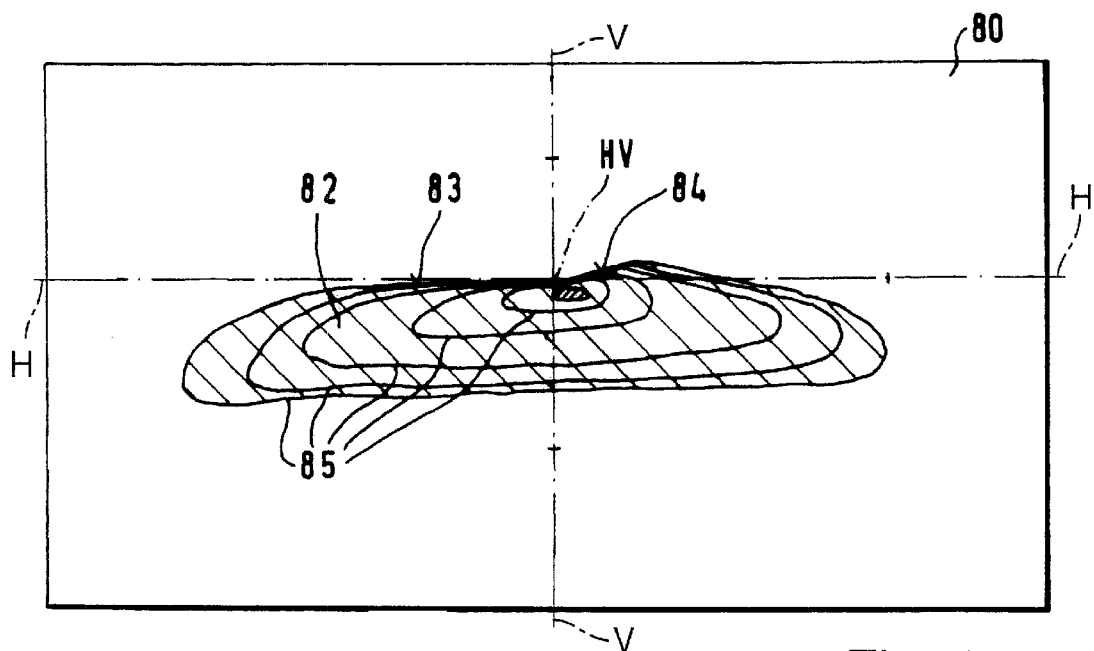
FIG. 2 is a view showing a measuring screen which is arranged in front of the headlight in accordance with the present invention and illuminated by a low beam produced with the headlight.

FIG. 2 shows a measuring screen 80 arranged at a distance in front of the headlight and illuminated by the light beam which produces low beam by the headlight in the operational position. The measuring screen 80 has a horizontal central plane HH and a vertical central plane VV which intersect each other in a point HV. The measuring screen 80 represents the projection of a roadway, by which the light emitted by the headlight is illuminated. The headlight is designed for right traffic, so that the traffic side itself is the right side of the measuring screen 80 while the countertraffic side is the left side of the measuring screen 80. The low beam produced by the headlight illuminates the measuring screen 80 in a region 82. The region 82 is limited from above by the bright-dark limit, which at the countertraffic side or the left side of the measuring screen 80 has a horizontal portion 83 and at the traffic side or the right side of the measuring screen 80 has a portion 84 which extends to the right starting from the horizontal portion 83. The horizontal portion 83 of the bright-dark limit extends approximately. 1%, correspondingly approximately 0.57% under the horizontal central plane HH of the measuring screen 80. The portion 84 of the bright-dark limit is raised at an angle of approximately 15° to the horizontal central plane HH. The distribution of the illumination intensities in the region 82 is identified by several lines 85 which have the same illumination intensities or so-called isolux lines.

FIG. 4 shows the lamp support 20 with the light source 12 in an end position for high beam with broken lines. In its end position for high beam, the lamp support 20 is turned relative to the end position for low beam in clockwise direction around the axis 22. The light arc 24 of the light source 12 in the end position for high beam is turned relative to the end position for low beam relative to the optical axis of the reflector downwardly and toward an apex of the reflector 10. The lamp carrier 20 in the end position for high beam can be also located in abutment against an abutment 36. In addition, the screening device 26 can be removed from the path of the beam of the light emitted by the light source 12 partially or particularly. With the changed arrangement of the light source 12 relative to the reflector 10, the light emitted by the light source 12 is reflected by the reflector 10 with another characteristic than in the case of the arrangement of the light source 12 in its end position for low beam.

Figure 3:
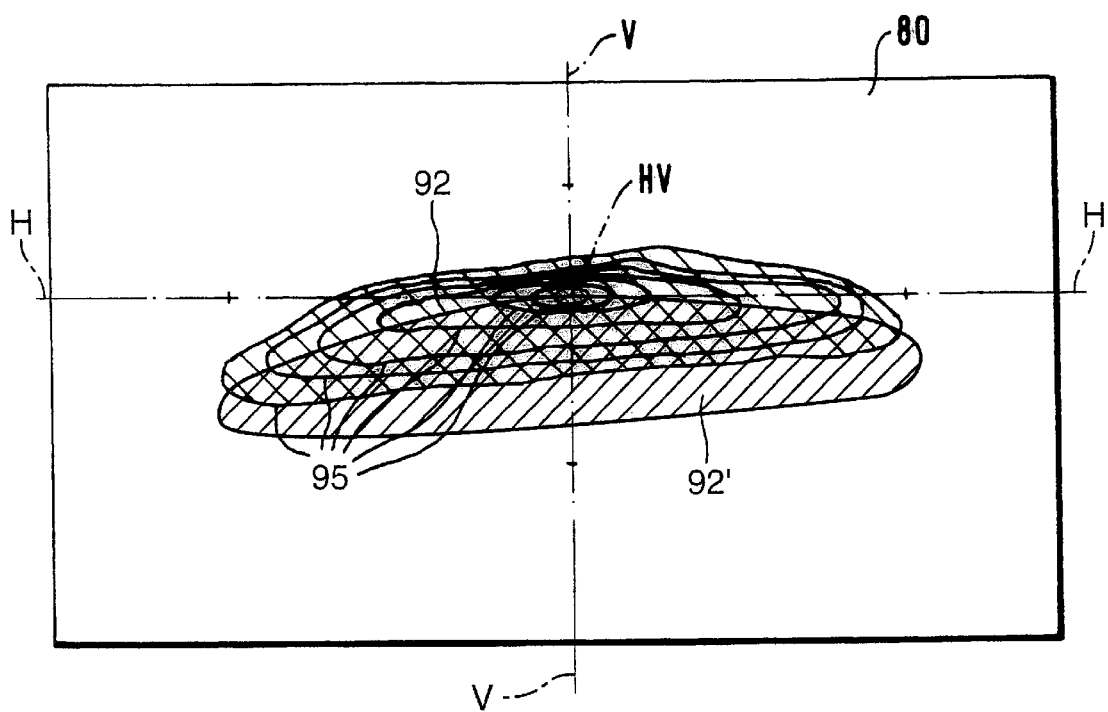
FIG. 3 is a view showing a measuring screen during illumination by a light beam produced with the reflector and having a greater distance.

FIG. 3 shows the measuring screen 8 which is illuminated by a light beam produced by the headlight with a light source 12 in its end position for high beam. The high beam illuminates a region 92, in which several isolux lines 95 are identified to illustrate the illumination intensity distribution. The region 92 illuminated by the high beam is offset upwardly relative to the region 82 illuminated by the low beam and has no or at least only less clearly pronounced bright-dark limit. The extension of the region 92 in a horizontal direction is at least approximately equal to that of the region 82. In the region 92 moreover a pronounced maximum of the illumination intensity with higher illumination intensity values than in the region 89 is provided. The high beam generated by the headlight has a greater distance than the low beam generated by the headlight.

It can be provided that the lamp support 20 with the light source 12 is movable only between the end position for low beam and the end position for high beam. Alternatively, it can be also provided that the lamp support 20 with the light source 12 can assume one or several intermediate positions between the end position for low beam and for high beam. The characteristic of the light beam produced by the headlight is approximately similar to the characteristic of the high beam, the closer the lamp carrier 20 with the light source 12 is arranged relative to the end position of the end position of the high beam. With the lamp carrier 20 with the light source 12 is moved from its end position for low beam in direction to the end position for high beam, the distance of the light beam produced by the headlight increases and the bright-dark limit is pronounced less clearly, so that the countertraffic can not be blinded.

The headlight, in addition to the adjusting device 28 also has a light width adjusting device 40 for changing the light width of the light beam produced by the headlight. The light width adjusting device 40 turns the headlight insert 14 about an axis 42 which extends at least approximately horizontally. The light width adjusting device 40 can have an electric drive motor 44 for moving an adjusting element 45 connected with the reflector 10, so as to provide a turning of the headlight insert 14 about the axis 42. The headlight in a not shown manner can be mounted on the body or on a structure of the motor vehicle. During a change of the loading of the motor vehicle or during the driving the inclination of the body or the structure of the motor vehicle can change, whereby the inclination of the headlight is changed also and thereby the light width of the light bundle produced by it. In particular for the low beam, its light width and thereby the position of its bright-dark limit 83, 84 in a vertical direction is exactly prescribed to prevent a blinding of the countertraffic. The light width adjusting device 40 serves for maintaining of the light width of the light beam produced by the headlight at least approximately constant, regardless of the loading of the motor vehicle. For this purpose the headlight insert 14 is turnable correspondingly around the axis 42. When the vehicle is unloaded, the light width and thereby the position of the bright-dark limit 83, 84 is adjusted correctly. When the motor vehicle is loaded, the headlight insert 14 is turned by the light width adjusting device 40 around the axis 42 downwardly so that the light width and thereby the position of the bright-dark limit 82, 84 are adjusted again correctly.

An electrical preswitching device 46 is provided for the light source 12. It provides operation of the light source 12 independently from its operational condition with the required electrical voltage, a current and a resulting electrical power. The preswitching device 46 serves for igniting the light source 12 and for providing a stabile operation of the light source 12.

In accordance with the present invention, a safety device 50 is provided in the headlight. The safety device 50 monitors, whether the adjusting device 28 operates in an orderly fashion and the lamp support 20 with the light source 12 is located in a correct position for the corresponding operation position of the headlight, or in other words low beam or high beam. With the safety device 50, for example the operational current of the electric motor 30 of the adjusting device 28 is monitored. When the adjusting device 28 is activated the electric motor 30 is supplied with current of a predetermined current intensity to move the lamp support 20 with the light source 12. When the actual current intensity deviates from the predetermined current intensity, a faulty operation of the adjusting device 28 can occur and as a result the lamp support 20 with the light source 12 is located not in the position for the selected operational condition, in other words low beam or high beam. In the case of an interruption of the electrical connection of the adjusting device 20 with the required voltage source 52, for example because of the cable breakage, no operational current is available for the electric motor 30 which can be recognized by the safety device 50 as an error. Also in this case the lamp carrier 20 with the light source 12 is not located in the position which is required for the corresponding operational condition, or in other words low beam or high beam.

When the safety device 50 recognizes an error, it actuates the operations, with which a blinding of the countertraffic is avoided, or at least reduced. It can be provided that the safety device 50 influences the preswitching device 36 of the light source 1 so that the light source 12 is operated by the preswitching device 46 with electric power which is reduced relative to the normal electric power. The electric power is reduced so much that no or only a little blinding of the countertraffic is caused. The electric power can be reduced to zero so that the light source 12 is no longer operated and shut off. Conventionally, two headlights are provided on the vehicle, and with the use of a gas discharge lamp as the light source 12 also when only one headlight is operated, a sufficient illumination is guaranteed.

Alternative or additionally to the above explained reduction of the electrical power, with which the light source 12 is operated, it is possible to control by the safety device 50 the light width adjusting device 40 in the case of error so that the headlight insert 14 is turned by it around the axis 42 downwardly and thereby the light width of the light beam produced by the headlight is reduced. For the case when the lamp support 20 with the light source 12 is located in the position for high beam at the measuring screen 80 is illuminated in the region 92 in FIG. 3, the light beam is lowered so that the region 92 is lowered downwardly to the position 92' shown with broken lines in FIG. 3. The region 92' is lowered so much that it no longer extends over the horizontal central plane HH of the measuring screen 80. By the lowering of the light beam with the light width adjusting device 40 a blinding of the countertraffic is avoided or at least reduced. In addition as described above, the vehicle power in which the light source 12 is operated, can be reduced as well.

It can be also provided that with the safety device 50, the relative arrangement between the light source 12 and the reflector 10 is monitored to the relative position, whether it corresponds to a predetermined position. With the safety device 50 it is therefore monitored whether the lamp, support 20 with the light source 12 is located in the position for the respective operational condition, or in other words low beam or high beam. It can be provided that a position sensor 52 is arranged correspondingly at the abutment 34, 36 which determines the position of the lamp support 20. The sensor detects the abutment of the lamp support 20 against the corresponding abutment 34, 36. A potentiometer, an end switch or a position-indicating sensor can be used as the position sensor 52. When the lamp support 20 is located not in the position at the correct abutment for the corresponding operational condition of the headlight, or in other words the operational position for low beam in the abutment against the abutment 34 or in the operational position for high beam in the abutment against the abutment 36, this is recognized by the safety device 50. As in the previous embodiment, it reduces the power of the light source 12 or turns it off and/or turns downwardly by the lightwidth adjusting device 40 of the headlight insert 14.

Alternatively or additional to the above described embodiment, a reduction of the distance of the light beam produced by the headlight insert 14 in the case of error can be performed so that, with the safety device 50 a screening device 54 is activated. It screens a part of the light beam with the greatest distance produced by the headlight insert 14 at least partially. The screening device 54 can be formed as a movable screen or stationary and formed with changeable light permeability.

It will be understood that each of the elements described above, or two or more together, may also find a useful application in other types of constructions differing from the types described above.

While the invention has been illustrated and described as embodied in headlight for vehicle for producing a low beam and at least one light beam for a greater range, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for a vehicle for producing a low beam and at least one light beam with a greater distance, the headlight comprising a light source; a reflector, said light source and said reflector together forming a headlight insert; an electrically adjusting device for changing a relative position between said light source and said reflector; a light width adjusting device for turning said headlight insert about an at least approximately horizontally extending axis; and a safety device operative for monitoring at least indirectly an operation of said adjusting device and in the case of an error when said electrically adjusting device operates improperly, said safety device reduces an electric power with which said light source is operated and/or reduces a distance of a light beam produced by said headlight unit.

2. A headlight as defined in claim 1, wherein said safety device is operative for monitoring an operational current of said adjusting device as to whether the operational current deviates from a predetermined operational current.

3. A headlight as defined in claim 1, wherein said safety device monitors a relative position between said light source and said reflector as to whether the position corresponds to a predetermined relative position.

4. A headlight as defined in claim 1, wherein said safety device in the case of an error disables said light source.

5. A headlight as defined in claim 1, wherein in the case of error said light width adjusting device is controlled by said safety device, so that said headlight unit is turned downwardly and thereby a distance of light beam produced by said headlight unit is reduced.

6. A headlight as defined in claim 1, wherein said adjusting device includes an electric drive motor which is formed as a stepper motor.

7. A headlight as defined in claim 1, wherein said light source is a gas discharge lamp which is provided for its operation with an electrical preswitching device, said safety device in the case of error controls said preswitching device for reducing an electric power with which said gas discharge lamp is operated by said preswitching device.

* * * * *